United States Patent
Biggs et al.

(10) Patent No.: US 9,536,116 B2
(45) Date of Patent: Jan. 3, 2017

(54) ACTIVE COMPONENT EMBEDDED IN CABLE

(71) Applicant: Hewlett-Packard Development Company, L.P., Houston, TX (US)

(72) Inventors: Kent E Biggs, Tomball, TX (US); Michael Provencher, Cypress, TX (US); Thomas Flynn, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/653,450

(22) PCT Filed: Dec. 21, 2012

(86) PCT No.: PCT/US2012/071298
§ 371 (c)(1),
(2) Date: Jun. 18, 2015

(87) PCT Pub. No.: WO2014/098901
PCT Pub. Date: Jun. 26, 2014

(65) Prior Publication Data
US 2015/0310232 A1    Oct. 29, 2015

(51) Int. Cl.
*H04L 12/28* (2006.01)
*G06F 21/85* (2013.01)
*G06F 13/14* (2006.01)

(52) U.S. Cl.
CPC ............... *G06F 21/85* (2013.01); *G06F 13/14* (2013.01)

(58) Field of Classification Search
CPC ................................ G06F 21/85; G06F 13/14
See application file for complete search history.

(56) References Cited

U.S. PATENT DOCUMENTS

| | | | |
|---|---|---|---|
| 6,792,532 B1 * | 9/2004 | Lee | H04L 12/40104 348/E7.056 |
| 7,178,724 B2 | 2/2007 | Tamagno et al. | |
| 7,627,753 B2 * | 12/2009 | Whitten | A63F 13/12 713/161 |
| 9,396,339 B2 * | 7/2016 | Schibuk | H04L 9/321 |
| 2005/0076208 A1 * | 4/2005 | Hori | G06F 21/10 713/165 |
| 2005/0114663 A1 * | 5/2005 | Cornell | G06F 21/57 713/168 |

(Continued)

FOREIGN PATENT DOCUMENTS

JP     2009-253916 A     10/2009

OTHER PUBLICATIONS

PCT Search Report/Written Opinion—Application No. PCT/US2012/071298—Dated Sep. 13, 2013~12 pps.

(Continued)

*Primary Examiner* — Taghi Arani
*Assistant Examiner* — Sharon Lynch
(74) *Attorney, Agent, or Firm* — HP Patent Department (57) ABSTRACT

Examples disclose a cable to secure data transmission. Examples of the cable include a connector to connect to a computing device for data transmission. Further, the examples of the cable include an active component coupled to the connector and embedded in the cable. The active component is to at least perform one of encrypt and decrypt the data transmitted on the cable.

10 Claims, 5 Drawing Sheets

(56) References Cited

U.S. PATENT DOCUMENTS

| | | | |
|---|---|---|---|
| 2005/0114697 A1* | 5/2005 | Cornell | G06F 21/57 726/3 |
| 2005/0114710 A1* | 5/2005 | Cornell | G06F 21/57 726/4 |
| 2005/0182934 A1* | 8/2005 | Elteto | H04L 9/0838 713/169 |
| 2006/0107073 A1* | 5/2006 | Lane | E05B 73/0005 713/194 |
| 2007/0206641 A1* | 9/2007 | Egan | G09G 5/006 370/479 |
| 2008/0022023 A1 | 1/2008 | Kim et al. | |
| 2008/0104212 A1* | 5/2008 | Ebrom | D06F 39/005 709/222 |
| 2008/0125912 A1* | 5/2008 | Heilman | D06F 39/005 700/275 |
| 2008/0143489 A1* | 6/2008 | Castaldo | G06F 9/54 340/286.01 |
| 2008/0188963 A1* | 8/2008 | McCoy | G06F 9/54 700/90 |
| 2009/0061678 A1* | 3/2009 | Minoo | G06F 21/44 439/502 |
| 2009/0132070 A1* | 5/2009 | Ebrom | D06F 39/005 700/90 |
| 2009/0132776 A1* | 5/2009 | Kurauchi | G06F 12/1416 711/163 |
| 2009/0158377 A1* | 6/2009 | Diab | G06F 1/266 725/117 |
| 2009/0323939 A1 | 12/2009 | Yu | |
| 2011/0087806 A1 | 4/2011 | Mohanty et al. | |
| 2012/0151219 A1* | 6/2012 | Ryu | H04L 9/0863 713/185 |
| 2012/0159165 A1* | 6/2012 | Schibuk | H04L 9/321 713/168 |
| 2013/0315396 A1* | 11/2013 | Bauer | H04L 9/0866 380/278 |
| 2014/0053256 A1* | 2/2014 | Soffer | G06F 21/34 726/9 |
| 2016/0134431 A1* | 5/2016 | Ebrom | H04L 67/12 709/217 |

OTHER PUBLICATIONS

Rosetta®Series II Smart Cards and USB Security Devices, 2012, pp. 1-2, Spyrus, Inc., Available at: <spryus.com/products/rosetta_smart_usb.asp>.

* cited by examiner

ACTIVE COMPONENT EMBEDDED IN CABLE

BACKGROUND

Retail solutions have increased focus on communications between a peripheral device and a point of sale device. Peripheral devices communicating to the point of sale device may transmit sensitive information, such as credit card data and/or personal information.

BRIEF DESCRIPTION OF THE DRAWINGS

In the accompanying drawings, like numerals refer to like components or blocks. The following detailed description references the drawings, wherein.

DETAILED DESCRIPTION

Peripheral devices communicating with point of sale devices may transmit sensitive information that may be susceptible to tampering and/or privacy issues. Transmitting the sensitive information (i.e., data) between devices may provide limited security. For example, data may be encrypted when received at the device level which enables a party to tamper with the data transmitted on the cable. Additionally, to provide encryption protection at each device becomes costly as this increases the component costs and design complexity.

To address these issues, example embodiments disclosed herein provide a cable comprising a connector for data transmission to and from a computing device. Additionally, the cable is further comprising an active component coupled to the connector and embedded in the cable. The active component is to perform at least one of encrypt and decrypt the data transmitted on the cable. Providing encryption and/or decryption at the cable level, provides a secure mechanism to transmit sensitive data between devices. Further, providing encryption and/or decryption at the cable level rather than at each device enables data to move within a system without requiring increased costs and design complexity. Furthermore, providing encryption and/or decryption within the cable creates a more standard implementation of protection across various systems.

In another embodiment, the active component utilizes a key specific to the computing device to perform the at least one of encryption and decryption of the data transmitted on the cable. Utilizing the key specific to the computing device prevents an unauthorized replacement of the cable as the computing device may verify the trust of the cable. This provides an additional security feature to prevent any tampering by replacing the cable to intercept the sensitive data.

In a further embodiment, the active component embedded in the cable remains passive until receiving the key specific to the computing device. Remaining a passive, the cable does not perform encryption and/or decryption until receiving the key. This enables the computing device to determine the trusted device and cable to receive the key for encryption and/or decryption. This provides further security as the cable may not perform encryption and/or decryption when moved to another system for operation with another computing device. Receiving the key specific to the computing device maintains the security pairing of the cable within the system.

In summary, example embodiments disclosed herein provide a secure mechanism to encrypt and/or decrypt sensitive data internally to a cable for transmission between devices. Further, example embodiments disclosed herein provide a standard implementation for protection across various systems.

Figure 1A:
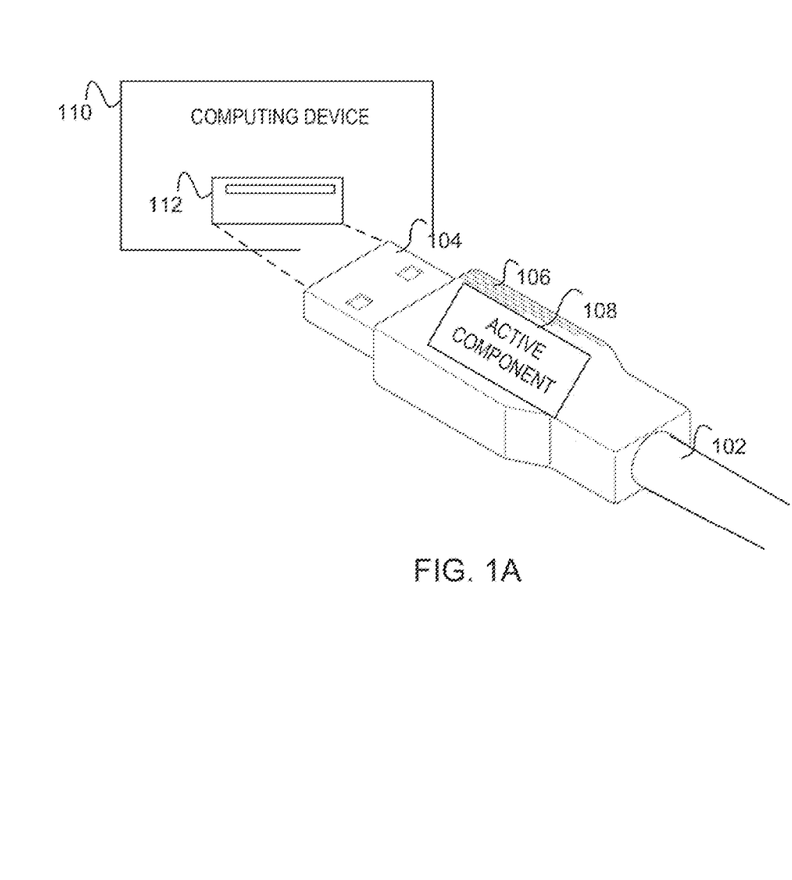
FIG. 1A is a block diagram of an example cable including a connector and active component to secure data transmission to a computing device.
Figure 1B:
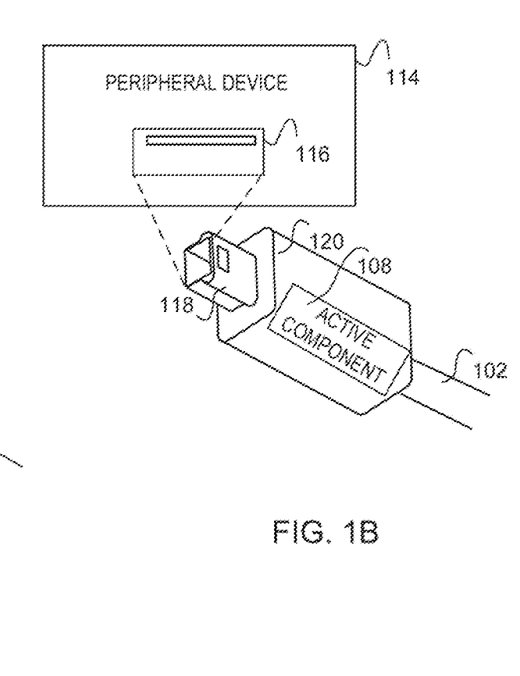
FIG. 1B is a block diagram is a block diagram of an example cable with an additional connector and active component to secure data transmission between a peripheral device and a computing device.

Referring now to the figures, FIG. 1A is a block diagram of a cable 102 with a connector 104 and active component 108 to secure data transmission to a computing device 110. The computing device 110 includes a connection area 112 for the connector 104 to connect for data transmission or the cable 102 between a computing device 110 and peripheral device. The peripheral device 114 is illustrated in FIG. 1B.

The cable 102 includes the connector 104, the housing 106, and the embedded or integrated active component 108 to perform at least one of encryption and decryption of data communications transmitted on the cable 102. The data communications may include bits, bytes, packets of data, and/or data streams for transmission between devices 110 and/or 114. As such, the cable 102 may include wires, insulation, or other material for carrying data across the wires to devices 110 and/or 114. Performing at least one of encryption and decryption of the data transmitted on the cable 102, by the component 108 intrinsic to the cable 102, provides a level of security to sensitive data. Embodiments of the cable 102 include a universal serial bus (USB) cable, fiber optic cable, fiber cable, networking cable, electrical cable, coaxial cable, or other type of cable capable of supplying data transmissions between the computing device 110 and/or peripheral device 114. In a further embodiment, the active component 108 receives a key specific to the computing device 110 to perform the at least one of encryption and decryption of data transmitted on the cable 102. Providing a key specific to the computing device 110 prevents an unauthorized replacement of the cable 102 in another system with another computing device as once the cable 102 is installed with the system of FIG. 1A, the cable 102 may revert to a passive type of cable. Reverting to the passive type of cable prevents the unauthorized replacement (e.g., interchanging) of the cable 102 and/or system in which the cable 102 is implemented. The passive type of cable transmits data without performing the at least one of encryption or decryption. Yet, in a further embodiment, once the active component 108 receives the key specific to the computing device 110, the cable 102 is considered an active type of cable as it provides at least one of encryption and decryption of the data transmitted across the cable 102. Installing the cable 102 in the system as in FIG. 1A, enables the cable 102 to work with that particular computing device 110 in a particular system. For example, a hacker may replace the cable 102 with an insecure cable (i.e., without active component 108), thus providing no security of the data transmitted on she cable 102.

The active component 108 is an electrical component coupled to the connector 104 and internal to the cable 102 for encryption and/or decryption of data transmitted on the cable 102. In this manner, the active component 108 may be embedded, integrated, and/or intrinsic to the cable 102. The active component 108 includes a housing 106 as part of the cable 102 to secure the active component 108 from external interferences. Use active component 108 includes machine-executable instructions to receive data for transmission across the cable 102 to perform encryption and/or decryption of the data. Encrypting and/or decrypting the data on the cable 102 by the active component 108 provides a more standardized security without increasing the costs of design and complexity at each device level. Additionally, this prevents a party from tampering with the data on the cable 102 as the data may be encrypted prior to transmission on the cable 102. In another embodiment, the active component 108 remains passive (i.e., without performing encryption and/or decryption) until receiving a key specific to the computing device 110 to perform the encryption of the data across the cable 102. Embodiments of the active component 108 include a silicon chip, controller, processor, integrated circuit, central processing unit or other type of electrical component capable of performing encryption and/or decryption of data transmitted on the cable 102.

The housing 106 is an external casing that prevents particles and other types of external parameters from interfering with the active component 108. The housing 106 protects the active component 108 from various environmental parameters that include physical shock, vibration, water, dust, etc. to ensure the integrity of the active component 108 and its various connections. In a further embodiment, the housing 106 provides safety by isolating the active component 106 from outside sources. The external casing of the housing 106 may be include various materials such as plastic, silicon, or other type of material that provides protection of the active component 108.

The connector 104 provides a connection between the cable 102 and device 110. The connector 104 is an electromechanical component of the cable 102 for joining the cable 102 to the computing device 110 for obtaining electrical connections between the cable 102 and the device 110. Although FIG. 1A depicts the connector 104 as a standard USB type A plug, embodiments should not be limited to this illustration as the connector 104 may include a Standard. USB type B plug. Additionally, the connector 104 should not be limited to standard USB connectors as the type of connector 104 utilized in the systems of FIGS. 1A-1B, depends on the type of cable 102. For example, a modular connector, such as 8P8C may be used with an Ethernet cable, while D-subminiature type connector may be utilized with RS-232 type cable. As such, embodiments of the connector 104 include a modular connector, D-subminiature connector, USB connector, power connector, radio frequency connector, direct current power connector, and/or any combination of connector types. Further, the cable 102 may include an additional connector as in FIG. 1B to connect to the peripheral device, the cable 102 transmits encrypted and decrypted data between the computing device 110 and the peripheral device 114.

The computing device 110 includes the connection area 112 to receive the connector 104 for data communications across the cable 102 to another computing device or peripheral device 114. In another embodiment, the computing device 110 receives encrypted data across the cable 102 for receipt by an application and/or operating system residing on the computing device 110. In this embodiment, the computing device 110 decrypts the encrypted data for processing. In a further embodiment, the computing device 110 receives encrypted data from the cable 102 for transmission to a network for processing of the encrypted data. In tins embodiment, the encrypted data is transmitted over the network and then decrypted at the network. Embodiments of the computing device 110 include a host device, a point of sale device, personal computer, desktop computer, laptop, mobile device, tablet, game console, or other type of electrical device capable of including connection area 112 for communication among devices through data transmission on the cable 102.

FIG. 1B is a block diagram of an example cable 102 with an additional connector 118 and active component 108 to secure data transmission between a peripheral device 114 and a computing device 110. FIG. 1B illustrates the other end of the cable 102 with the additional connector 118 to illustrate the connections for data transmission between the devices 110 and 114. Additionally, although FIG. 1A and FIG. 1B illustrate the active component 108 as a single component for encryption and/or decryption, the cable 102 may include at least two active components 108 for encryption prior to transmission and decryption at the point of arrival for processing at the device 110 or 114. The cable 102 and the housing 120 may be similar and structure to the cable 102 and housing 106 as in FIG. 1A.

The additional connector 118 illustrates the opposite end of the cable 102 trout the connector 104. The additional connector 118 connects the peripheral device 114 to the cable 102 through the connection 116. Connecting the peripheral device 114 enables the cable 102 to transmit data between the devices 110 and 114. Additionally, to securely transmit the data between the devices 110 and 114, the cable 102 includes the integrated active component 108 to perform at least one of encryption and decryption of the data. Further, although FIG. 1B depicts the additional connector 118 as a standard type of connector, embodiments should not be limited as this was done for illustration purposes. For example, the additional connector 118 may be a different type of connector from the connector 104 as in FIG. 1A or connectors 104 and 118 may include similar types of connectors. Embodiments of the additional connector 118 include a modular connector, D-subminiature connector, USB connector, power connector, radio frequency connector, direct current power connector, and/or any combination of connector types.

The connection 116 is the area on the peripheral device 114 for the other end of the cable 102 to connect for data transmission between the devices 110 and 114. The peripheral device 114 includes an electronic device, such a retail point of sale device for data communications to the computing device 110 through the cable 102. For example, the peripheral device 114 may include a credit card reader and as such may transmit, the data to an application on the computing device 110 for processing. The credit card information transmitted by the peripheral device 114 may be sensitive to tampering and as such may be encrypted at the active component 108 prior to the transmission on the cable 102 to the computing device 110. Embodiments of the peripheral device 114 include a bar code scanner, computing device accessory, mouse, keyboard, scanner, printer, receipt printer, barcode reader, scale, cash drawer, or other type of electronic device capable of transmitting and receiving data through the cable 102.

Figure 2:
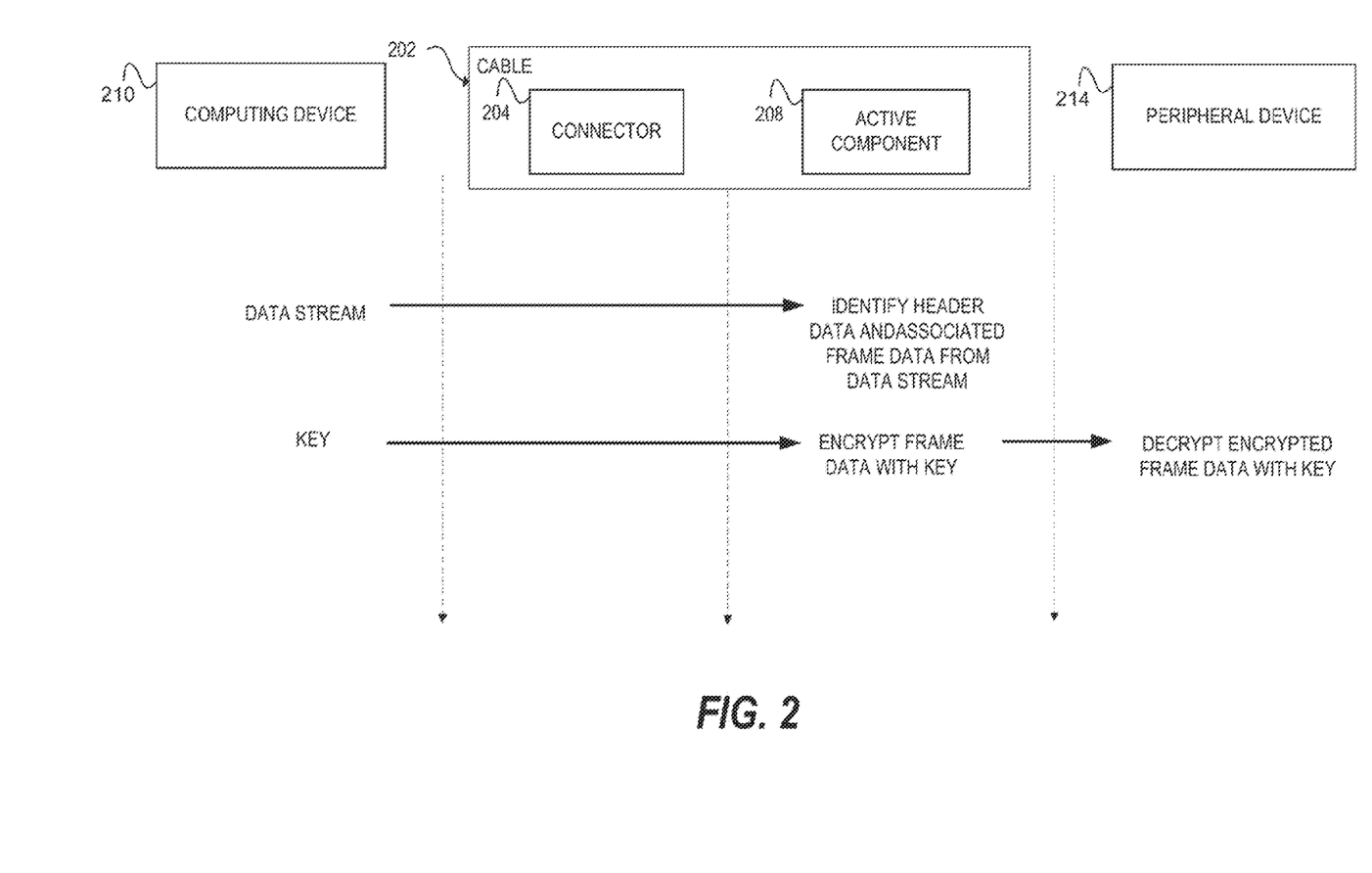
FIG. 2 is a communication diagram of an example communication between a computing device and peripheral device on a cable with a connector and active component.

FIG. 2 is a communication diagram of an example communication between a computing device 210 and peripheral device 214 on a cable 202 with a connector 204 and active component 208. The computing device 210, the cable 202, the connector 204, the active component 208, and the peripheral device 214 may be similar in structure and functionality to the computing device 110, the cable 102, the connector 104, the active component 108, and the peripheral device 114 as in FIGS. 1A-1B.

The computing device 210 transmits a data stream on the cable 202 through the connector 204 to the active component 208. The active component 208 identifies header data and associated frame data from the data stream. Identifying the header data from the frame data, the active component 208 may separate the frame data from the data stream for encryption. The active component 208 may further receive a key from the computing device 210 to encrypt the frame data identified from the data stream. The header data is considered supplemental data placed at the beginning of the data stream to describe the other data (e.g., frame data) without explicitly holding the other data. The header data includes supplemental data to indicate to the active component 208 to encrypt the other data. The frame data is part of the data stream that includes data which may be sensitive. For example, the header data may describe the size of the frame data and the frame data may include credit card information for processing at the computer 210. Identifying the header data enables the active component 208 to identify the beginning of a data stream and identify the aspect of the data which may need to be protected due to sensitivity and privacy issues. The active component 208 may then encrypt this sensitive data (i.e., frame data) with the key received from the computing device 210, to then transmit to the peripheral device 214. The peripheral device 214 receives the encrypted frame data to decrypt for further processing. The peripheral device 214 may decrypt the encrypted frame data utilizing the key specific to the computing device 210. The key is used as a tool to encrypt and/or decrypt the data and may reside at the peripheral device 214 or may be received with the encrypted frame data. The active component 208 embedded in the cable 202, may use the key to hash the frame date while the peripheral device 214 may un-hash this data utilizing the key. In this regard, the key may be common among the computing device 210, the cable 202, and the peripheral device 214. The common key may be authorized by utilizing a list of authenticated devices 210 and 214 or may be sent with the encrypted frame data.

In another embodiment, the active component 208 may utilize the key to decrypt encrypted data transmitted on the cable 202 prior to arrival at either the computing device 210 or the peripheral device 214. In a further embodiment, the key is specific to the computing device 210 to prevent an unauthorized replacement of the cable 202. For example, the computing device 210 may receive a signal from the active component 208 integrated within the cable 202 to verify the trust of the cable 202 prior to transmitting the key. The signal may include a type of identifier for the computing device 210 to recognize the cable 202 as trusted. Utilizing a key specific to the computing device 210 provides additional security and/or protection as the active component 208 may need to verify identify to the computing device 210 to receive the key from the computing device 210. Additionally, this prevents any replacements of the cable 202 and/or computing device 210 which may be unauthorized.

Figure 3:
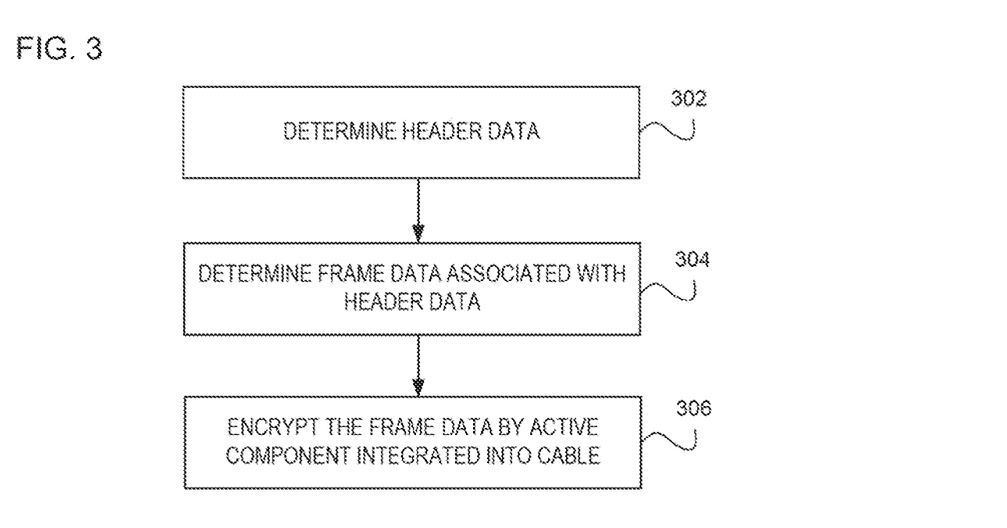
FIG. 3 is a flow chart of an example method to determine header data and frame data for encryption of the frame data by an active component integrated into a cable.

FIG. 3 is a flow chart of an example method to determine header data and frame data for encryption of the frame data by a component integrated into a cable. In discussing FIG. 3, reference may be made to the components of FIGS. 1A-1B to provide contextual examples. Further, although FIG. 3 is described as implemented on active components 108 and 208 as in FIGS. 1-2, it may be executed on other suitable components. For example, FIG. 3 may be implemented in the form of executable instructions on a machine-readable storage medium 504 as in FIG. 5.

At operation 302 the active component determines header data. In another embodiment, operation 302 receives a data stream including header data and frame data. The header data describes the other data transmitted on the cable and may include information such as the type of data, the device data from which the data stream originates, size of the data stream, whether the data is encrypted or decrypted, or whether the data is synchronous or synchronous, etc. The header data may also serve as flag to indicate to the active component sensitive data is included in the data stream and to perform encryption of the sensitive data. In a further embodiment, the active component encrypts me frame data without encrypting the header data. In this manner, the data stream including both the header data and the encrypted frame data may be identified by the computing device and/or peripheral device for decryption and processing by an application residing on the computing device and/or peripheral device.

At operation 304 the active component integrated in the cable determines frame data associated with the header data. Once identifying the header data at operation 302, the active component determines the frame data for encryption at operation 306.

At operation 306 the active component integrated into the cable encrypts the frame data. In one embodiment, the active component receives a key specific to a computing device to encrypt and decrypt the frame data, in another embodiment operation 306 includes the computing device receiving encrypted data by an operating system or application residing on the device. In a further embodiment, operation 306 includes the encrypted data being transmitted from a computing device to an application residing on a network.

Figure 4:
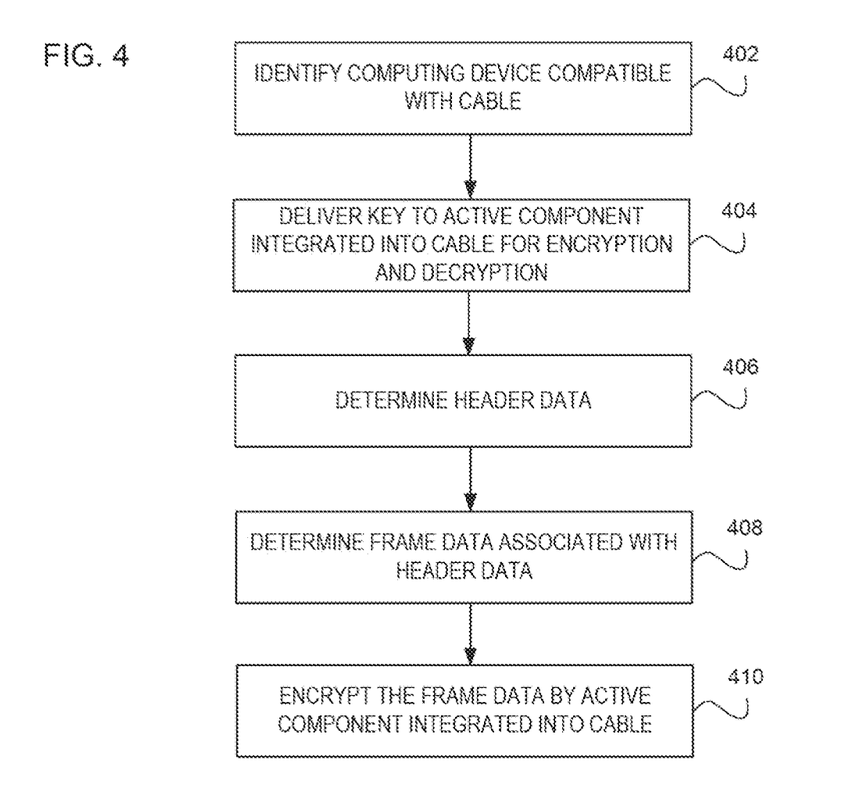
FIG. 4 is a flowchart of an example method to identify a computing device compatible with a cable for security, deliver a key specific to the computing device to an active component integrated into a cable for encryption and decryption, the active component to determine header data and frame data for encryption of the frame data.

FIG. 4 is a flowchart of an example method to identify a computing device compatible with a cable for security, deliver a key specific to the computing device to an active component integrated into a cable for encryption and decryption, and determine header data and Same data for encryption of the frame data. In discussing FIG. 4, reference may be made to the components of FIGS. 1A-1B to provide contextual examples. Further, although FIG. 4 is described as implemented on active components 108 and 208 as in FIGS. 1-2, it may be executed on other suitable components. For example, FIG. 4 may be implemented in the form of executable instructions on a machine-readable storage medium 504 as in FIG. 5.

At operation 402 the active component may identify the computing device as compatible and/or trusted for use with the cable. Operation 402 may include the active component transmitting a signal to the computing device for authentication. In another embodiment, the active component may identify the computing device as part of a class of computing devices for which the cable may be compatible for performing at least one of encryption and decryption. The class of computing devices may be identified as those devices which may be trusted for use with cable. In a further embodiment, identifying the computing device as compatible with the cable includes transmitting a common key to each of the trusted device(s) for encryption and/or decryption at operation 410.

At operation 404 a key is received by the active component integrated into the cable for encryption and/or decryption of data across the cable. For an application, service, and/or device to access the encrypted data, it may need access to a private key to decrypt the encrypted data. In one embodiment, an authentication list of devices and/or applications would be maintained so approved entities would have access to the key for decrypting the encrypted data. Maintaining the authentication lists provides another level of security so tasted entities would have access to the key. For example, five credit card readers with particular serial numbers may be authorized for encryption of the credit card information with a particular cable. The credit card information may then be encrypted within the particular cable as it is transmitted to a host device for farther processing. These credit card readers may be granted a common key to perform decryption of data, over the cable from the host device.

At operations 406-408, the active component within the cable determines header data, and determines the frame data associated with the header data. At operation 410, the active component encrypts the frame data identified at operation 408. Operations 406-410 may be similar in structure to operations 302-306 as in FIG. 3.

Figure 5:
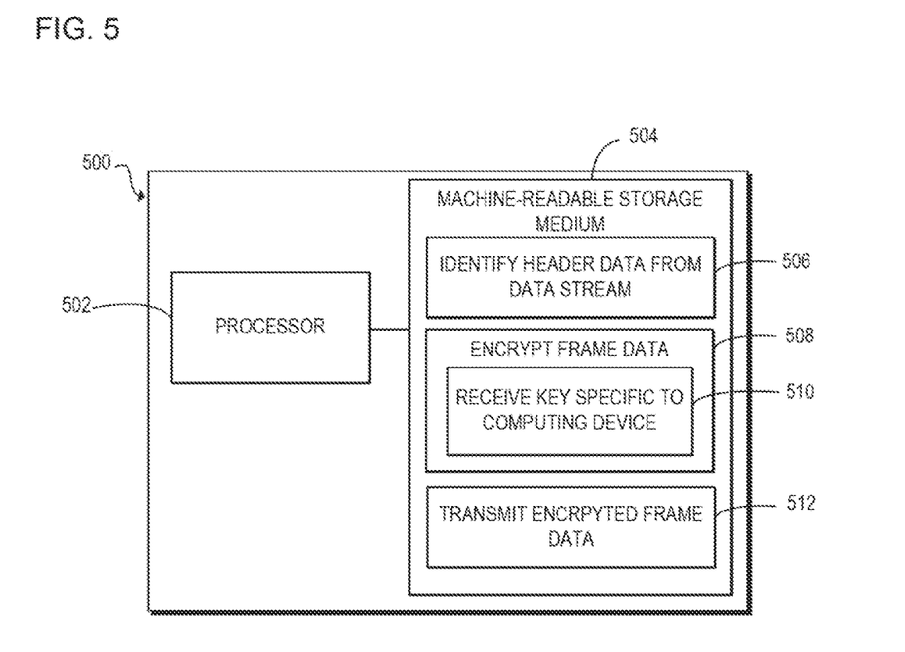
FIG. 5 is a block diagram of an example computing device with a processor to identify header data from a data stream, encrypt frame data associated with the header data by receiving a key specific to the computing device, and transmit the encrypted frame data.

FIG. 5 is a block diagram of an example computing device 500 with a processor 502 to identify header data from a data stream, encrypt frame data associated with the header data by receiving a key specific to the computing device, and transmit the encrypted frame data. Although the computing device 500 includes processor 502 and machine-readable storage medium 504, it may also include other components that would be suitable to one skilled in the art. For example, the computing device 500 may include connection area 112 as in FIG. 1. Additionally, the computing device 500 may be similar in structure and functionality of the computing devices 110 and 210 as set forth in FIG. 1 and FIG. 2, respectively.

The processor 502 may fetch, decode, and execute instructions 506-512. Embodiments of the processor include a microchip, chipset, electronic circuit, microprocessor, semiconductor, microcontroller, controller, silicon, chip, central, processing unit (CPU), graphics processing unit (GPU), visual processing unit (VPU), or other programmable device capable of executing instructions 506-512. Specifically, the processor 502 executes: instructions 506 to identify header data from a data stream; instructions 508 to encrypt frame data associated with, the header data; instructions 510 to receive a key specific to a computing device to encrypting the frame data; and instructions 512 to transmit the encrypted frame data.

The machine-readable storage medium 504 includes instructions 506-512 for the processor 502 to fetch, decode, and execute. The machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processor 502 to fetch, decode, and/or execute instructions of the machine-readable storage medium 504. The application and/or firmware may be stored on the machine-readable storage medium 504 and/or stored on another location of the computing device 500. In discussing FIG. 5, reference is made to the components of FIGS. 1A-1B and FIG. 2 to provide contextual examples.

At instructions 506, an active component, integrated into a cable, identifies header data from a data stream. The data stream, transmitted between a computing device and a peripheral device on the cable, includes header data and frame data. The active component on the cable receives the data stream and identifies the header data from the frame data. In this manner, the active component identities the data of which may be sensitive and encrypts the data at instructions 508.

At instructions 508, the active component encrypts the frame data associated with the header data identified at instructions 506. The frame data is considered part of the data stream that may include sensitive information, such as credit card information and/or other personal information. Encrypting the frame data by the active component embedded in the cable provides a level of protection at the cable level preventing a third, party from tampering with the sensitive information at the device level. In another embodiment, the active component encrypts the frame data milking a key specific to a computing device as at instructions 510.

At instructions 510, the active component receives the key specific to the computing device for encryption and/or decryption of the frame data. In another embodiment, instructions 510, identifies a class of computing devices for compatibility with the active component integrated in the cable.

At instructions 512, the encrypted frame data at instructions 508 is transmitted to either the computing device or the peripheral device. Instructions 512 may include decrypting the frame data at either the computing device or the peripheral device to process the information within the frame data.

In summary, example embodiments disclosed herein provide a secure mechanism to encrypt and/or decrypt sensitive data internally to a cable for transmission between devices. Further, example embodiments disclosed herein provide a standard implementation for protection across various systems.

We claim:

1. A cable for data transmission, the cable comprising:
a connector to connect to a computing device for data transmission; and
an active component coupled to the connector and physically embedded in the cable, the active component to perform at least one of encrypting and decrypting data transmitted on the cable after a key specific to the computing device is received by the active component and the computing device is authenticated by the active component as trusted for use with the cable, and to pass through the data transmitted on the cable without performing the encrypting or decrypting until the key is received by the active component,
wherein the active component encrypts the data transmitted on the cable by encrypting a frame data associated with header data but not encrypting the header data.

2. The cable of claim 1 wherein the cable is a universal serial bus cable and is further comprising:
an additional connector to connect to an peripheral device, the cable transmits encrypted and decrypted data between the computing device and the peripheral devices.

3. The cable of claim 1 wherein the active component utilizes the key specific to the computing device to perform the at least one of encrypting and decrypting the data transmitted on the cable to prevent an unauthorized replacement of the cable.

4. A method to transmit data within a cable, the method comprising:
- passing data received at the cable through the cable without encrypting the received data, until a key specific to a computing device communicatively coupled to the cable is received by an active component physically integrated into the cable and identifying the computing device by the active component as trusted for use with the cable prior to using the received key for encrypting the received data; and
- encrypting the received data by the active component, and transmitting the encrypting data through the cable, after the key is received by the active component,
- wherein the received data is encrypted by encrypting frame data associated with header data within the received data but not encrypting the header data.

5. The method of claim 4 further comprising:
- delivering the key specific to the computing device to the active component integrated into the cable for encryption and decryption.

6. The method of claim 4 wherein the active component utilizes the key specific to the computing device to encrypt and decrypt the frame data to prevent an unauthorized replacement of the cable.

7. The method of claim 4 further comprising:
- identifying the computing device compatible with the cable for security, the computing device part of a class of computing devices compatible with the cable.

8. A non-transitory machine-readable storage medium encoded with instructions executable by a processor of a computing device, the storage medium comprising instructions to:
- determine whether a key specific to the computing device is received by an active component physically integrated into a universal serial bus connection, wherein the active component transmits a signal to the computing device for authentication of the computing device as trusted for use with the cable;
- pass through data received over the universal serial bus connection until the key is received by the active component; and
- encrypt the received data by the active component and transmit the encrypted data over the universal serial bus connection after the key is received by the active component,
- wherein the received data is encrypted by identifying header data in the received data and encrypting frame data associated with the header data but not the header data.

9. The non-transitory machine-readable storage medium encoded with the instructions of claim 8 further comprising:
- identifying a class of computing devices for compatibility with the universal serial bus connection.

10. The non-transitory machine-readable storage medium of claim 8, wherein the instructions to transmit the encrypted data comprise instructions to:
- transmit the header data in unencrypted form together with the encrypted frame data over the universal serial bus connection.

* * * * *